United States Patent
Cseri et al.

(10) Patent No.: US 11,734,301 B1
(45) Date of Patent: Aug. 22, 2023

(54) SELECTIVE TABLE REPLICATION TO ENABLE STREAM REPLICATION

(71) Applicant: Snowflake Inc., Bozeman, MT (US)

(72) Inventors: Istvan Cseri, Seattle, WA (US); Tyler Jones, Redwood City, CA (US); Daniel E. Sotolongo, Seattle, WA (US); Boyuan Zhang, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/656,116

(22) Filed: Mar. 23, 2022

(51) Int. Cl.
*G06F 16/30* (2019.01)
*G06F 16/27* (2019.01)

(52) U.S. Cl.
CPC .................. *G06F 16/27* (2019.01)

(58) Field of Classification Search
CPC ...................................................... G06F 16/27
See application file for complete search history.

(56) References Cited

U.S. PATENT DOCUMENTS

| | | | |
|---|---|---|---|
| 9,619,172 B1 * | 4/2017 | Natanzon | G06F 3/064 |
| 2020/0012659 A1 * | 1/2020 | Dageville | G06F 16/245 |
| 2020/0142980 A1 * | 5/2020 | Cseri | G06F 16/2455 |
| 2020/0183908 A1 * | 6/2020 | Muralidhar | G06F 16/278 |

* cited by examiner

*Primary Examiner* — Khanh B Pham
(74) *Attorney, Agent, or Firm* — Schwegman Lundberg & Woessner, P.A.

(57) ABSTRACT

Techniques described herein can enable stream replication. A first deployment can store a table including one or more streams. The techniques described herein can be used to replicate the table at a second deployment while replicating the one or more streams associated with the table. Select prior table versions and partitions in the table are copied to the second deployment to enable stream replication.

9 Claims, 12 Drawing Sheets

SELECTIVE TABLE REPLICATION TO ENABLE STREAM REPLICATION

TECHNICAL FIELD

The present disclosure generally relates to a network-based database system and, more specifically, to replicating databases including change data capture determinations, such as streams or virtual tables.

BACKGROUND

Network-based database systems may be provided through a cloud platform, which allows organizations and users to store, manage, and retrieve data from the cloud. With respect to type of data processing, a database system could implement online transactional processing, online analytical processing, a combination of the two, and/or another type of data processing. Moreover, a database system could be or include a relational database management system and/or one or more other types of database management systems.

One such example is a cloud data warehouse (also referred to as a "network-based data warehouse" or simply as a "data warehouse"), which is a network-based system used for data analysis and reporting that comprises a central repository of integrated data from one or more disparate sources. A cloud data warehouse can store current and historical data that can be used for creating analytical reports for an enterprise. To this end, data warehouses can provide business intelligence tools, tools to extract, transform, and load data into the repository, and tools to manage and retrieve metadata.

Database data can be modified by various commands, including insert, delete, and update commands that modify one or more rows in a database table. It can be costly to track such modifications and to determine delta information between a first set of database data and a second set of database data. In some instances, a user of the network-based database system may wish to analyze different aspects of the table, such as changes or audits.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Data replication techniques are described herein. Database data can be replicated in secondary locations in case of failures at the primary location. However, replicating a current version of a table typically does not include valuable information such as past changes or change data capture information. The data replication techniques described herein can be used for stream replication. While conventional table replication methods typically copy a latest version of the table to be replication, the techniques described herein can selectively replicate select partition and table versions used by the replicated stream. Hence, the techniques described herein can use existing table partitions and versions to enable stream replication without adding significant storage and computational overhead.

Figure 1:
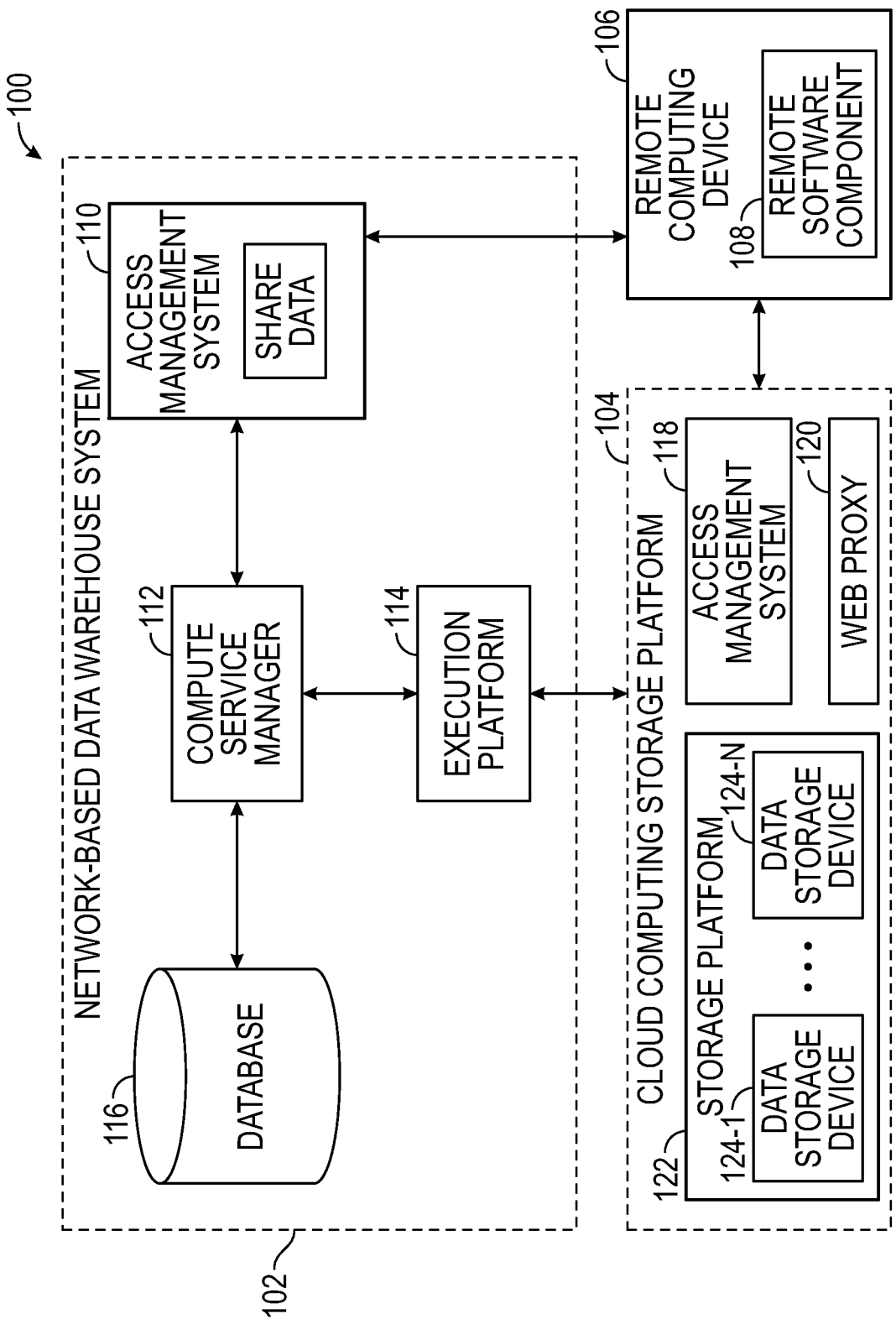
FIG. 1 illustrates an example computing environment in which a cloud database system can implement streams on shared database objects, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based database system 102 comprises an access management system 110, a compute service manager 112, an execution platform 114, and a database 116. The access management system 110 enables administrative users to manage access to resources and services provided by the network-based database system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based database system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based database system 102 to scale quickly in response to changing demands on the systems and components within network-based database system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
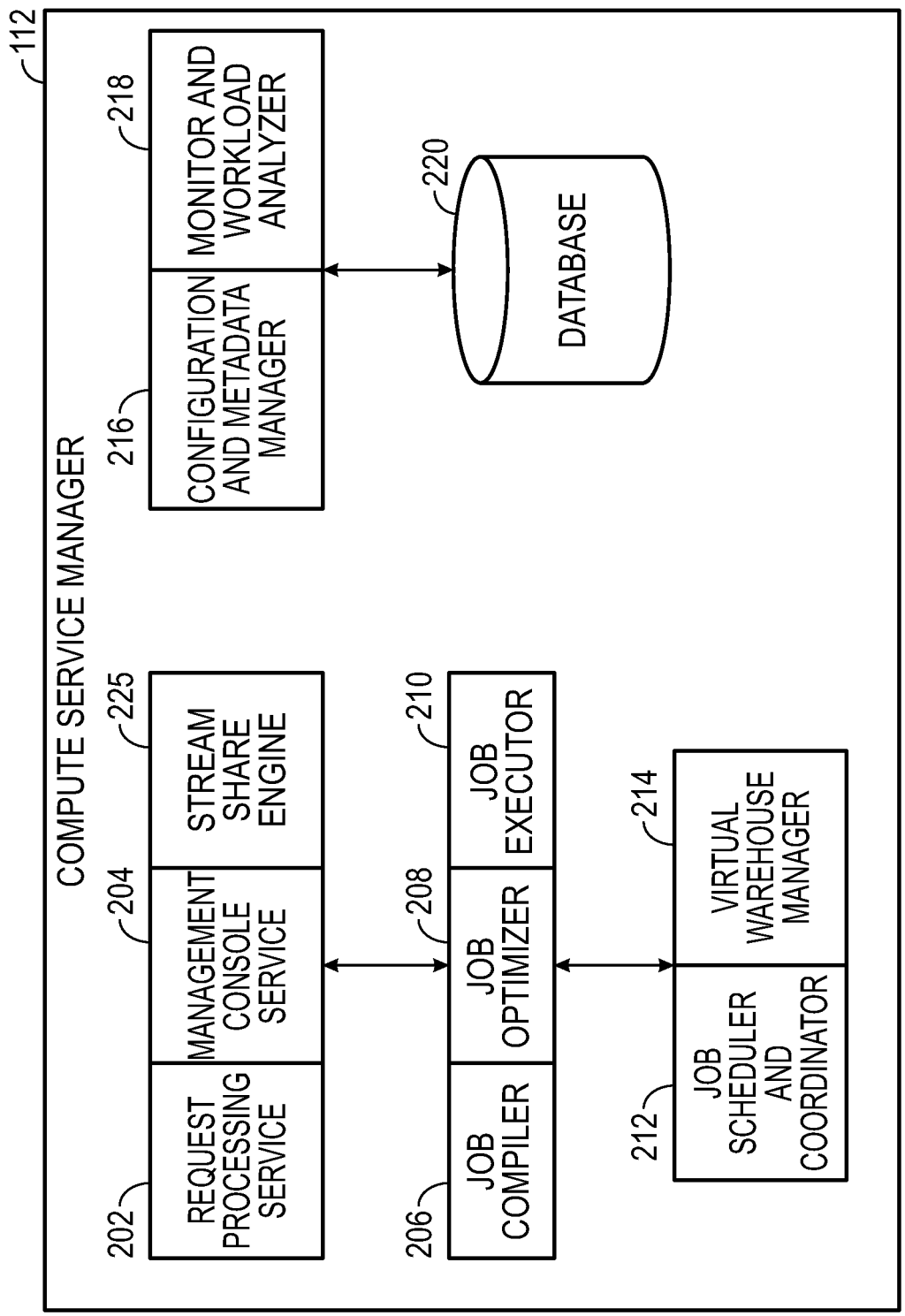
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based database system 102. For example, data storage device 220 may represent caches in execution platform 114, storage devices in cloud computing storage platform 104, or any other storage device.

Figure 3:
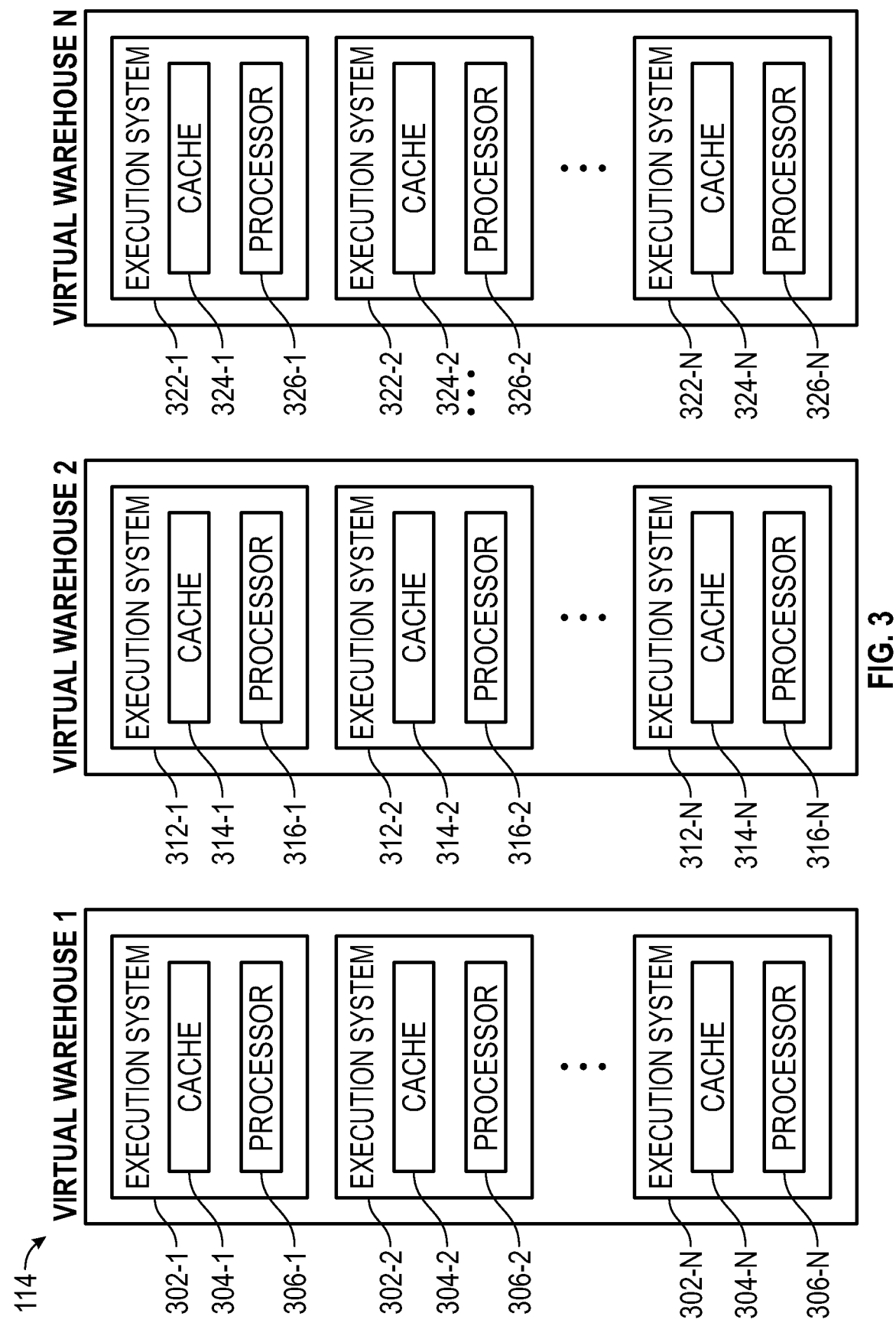
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124 -N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
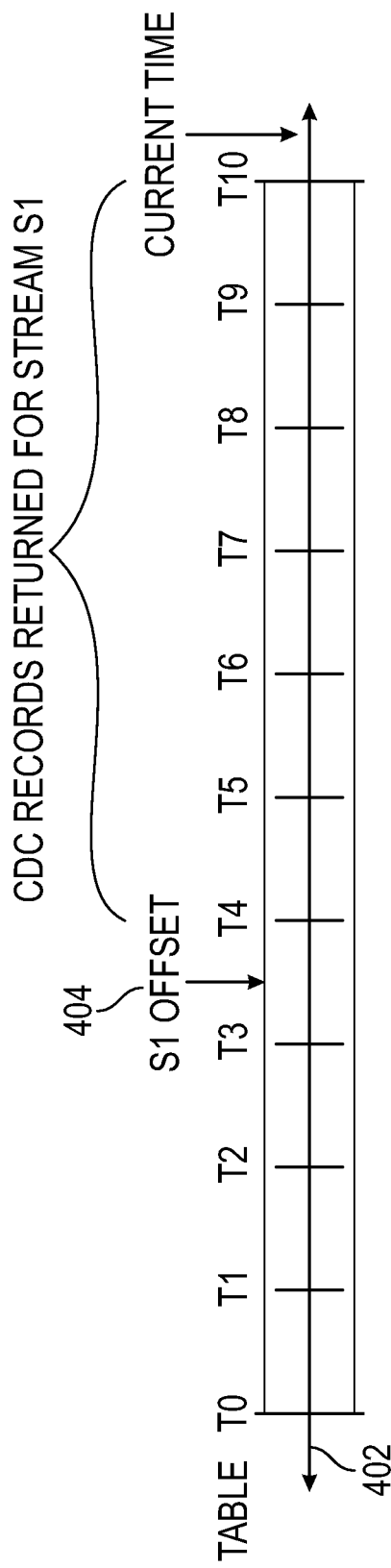
FIG. 4 shows an example of a stream, according to some example embodiments.

As mentioned above, changes made to a table can be tracked using streams. A stream is a virtual table showing change data capture (CDC) information between two points in a table. FIG. 4 shows an example of a stream, according to some example embodiments. A table 402 (also referred to as a base or source table) may be provided. The table 402 may store a set of data, for example customer data for a client. In some embodiments, the table 402 may be implemented as a view, which allows a result of a query to be accessed as if it were a table. In some embodiments, the table 402 may be implemented as a set of tables.

The table 402 is illustrated as having a plurality of versions: T0-T10. The versions may reflect changes (or modifications), such as data manipulation language (DML) operations executed on the table 402.

Data in the table 402 may automatically be divided into an immutable storage device referred to as a micro-partition (also referred to as a partition). A micro-partition may be an immutable storage device in a database table that cannot be updated in-place and must be regenerated when the data stored therein is modified. A micro-partition may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

A stream 404 (S1) may be created on the table 402. A stream is a virtual table showing change data capture (CDC) information between two points. Here, stream 404 (S1) has an offset between T3 and T4, and may show the CDC information between T4 and T10 (current time). Being a virtual table, the stream does not store information itself, but instead includes pointers to the underlying information. In this example, the stream 404 (S1) includes a set of pointers to the table 402. Multiple streams may be created for different points of time.

A stream object may record data manipulation language (DML) changes made to tables, including inserts, updates, and deletes, as well as metadata about each change, so that actions can be taken using the changed data. An individual table stream tracks the changes made to rows in a table. A stream can make a "change table" available of what changed, at the row level, between two transactional points of time in a table. This stream generation allows querying and consuming a sequence of change records in a transactional fashion.

When created, a stream logically takes an initial snapshot of the rows in the table by initializing a point in time (called an offset) as the current transactional version of the table. The change tracking system utilized by the stream then records information about the DML changes after this snapshot was taken. Change records provide the state of a row before and after the change. In some embodiments, change information can mirror the column structure of the tracked source table and includes additional metadata columns that describe each change event.

A stream itself does not contain table data. A stream only stores an offset for the table and returns CDC records by leveraging the versioning history for the table. When a first stream for a table is created, a pair of hidden columns are added to the table and begin storing change tracking metadata. The CDC records returned when querying a stream rely on a combination of the offset stored in the stream and the change tracking metadata stored in the table.

A new table version can be created whenever a transaction that includes one or more DML statements is committed to the table. In the transaction history for a table, a stream offset is located between two table versions. Querying a stream returns the changes caused by transactions committed after the offset and at or before the current time.

A stream can provide the minimal set of changes from its current offset to the current version of the table. Multiple queries can independently consume the same change data from a stream without changing the offset. In some embodiments, a stream advances the offset when it is used in a DML transaction. In these embodiments, querying a stream alone does not advance its offset, even within an explicit transaction; the stream contents are consumed in a DML statement to advance its offset.

Figure 5:
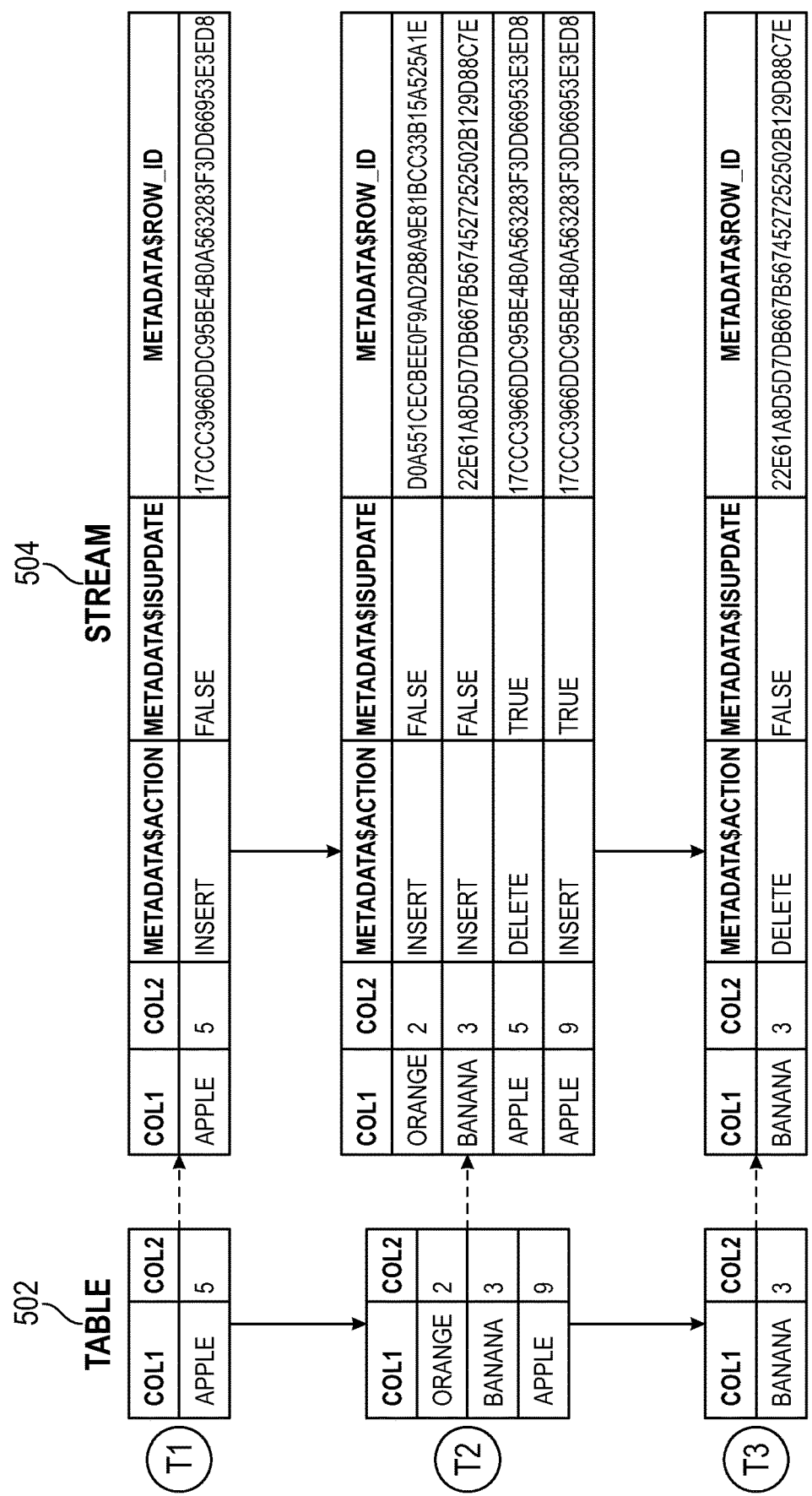
FIG. 5 shows a stream based on a table, according to some example embodiments.

FIG. 5 shows a stream based on a table, according to some example embodiments. A table 502 is shown with three versions: T0, T1, and T2. A stream 504 is shown tracking the CDC information as rows in the table 502 are updated. Whenever a DML statement consumes the contents of the stream 504, the position of the stream 504 advances to track the next set of DML changes to the table 502 (i.e., the changes in a table version).

The METADATA$ACTION column in stream 504 includes information regarding the DML operation (e.g., INSERT, DELETE) recorded. The METADATA$ISUPDATE column in stream 504 indicates whether the operation was part of an UPDATE statement. Updates to rows in the source table are represented as a pair of DELETE and INSERT records in the stream with a metadata column METADATA$ISUPDATE values set to TRUE. For example, as shown the deletion of "apple 5" and insertion of "apple 9" is shown in stream 504 as being part of an update command. The METADATA$ROW ID in stream 504 includes unique and immutable ID for the row, which can be used to track changes to specific rows over time.

Different types of streams can be provided. A delta stream tracks all DML changes to the source table, including inserts, updates, and deletes (including table truncates). A delta stream performs a join on inserted and deleted rows in the change set to provide the row level delta. As a net effect, for example, a row that is inserted and then deleted between two transactional points of time in a table is removed in the delta (i.e., is not returned when the stream is queried).

An append-only stream tracks row inserts only. Update and delete operations (including table truncates) are not recorded for append-only streams. For example, if 10 rows are inserted into a table and then 5 of those rows are deleted before the offset for an append-only stream is advanced, the stream records 10 rows.

An append-only stream returns the appended rows only and therefore can be more useful than a delta stream for extract, load, transform (ELT) and similar scenarios that depend exclusively on row inserts. For example, the table can be truncated immediately after the rows in an append-only stream are consumed, and the record deletions do not contribute to the overhead the next time the stream is queried or consumed.

As mentioned above, a table may be replicated and stored at a second location or deployment in case there is a failure at the primary location or deployment. However, conventional table replication techniques do not adequately account for stream replication because relevant information for stream replication such as table versions and partitions can be lost in the replication process.

Next, techniques for stream replication are described. The techniques described can use existing table partitions to enable stream replication without adding too much additional storage and computational overhead. That is because the stream replication techniques selectively replicate certain partition and table versions needed to enable stream replication.

Figure 6:
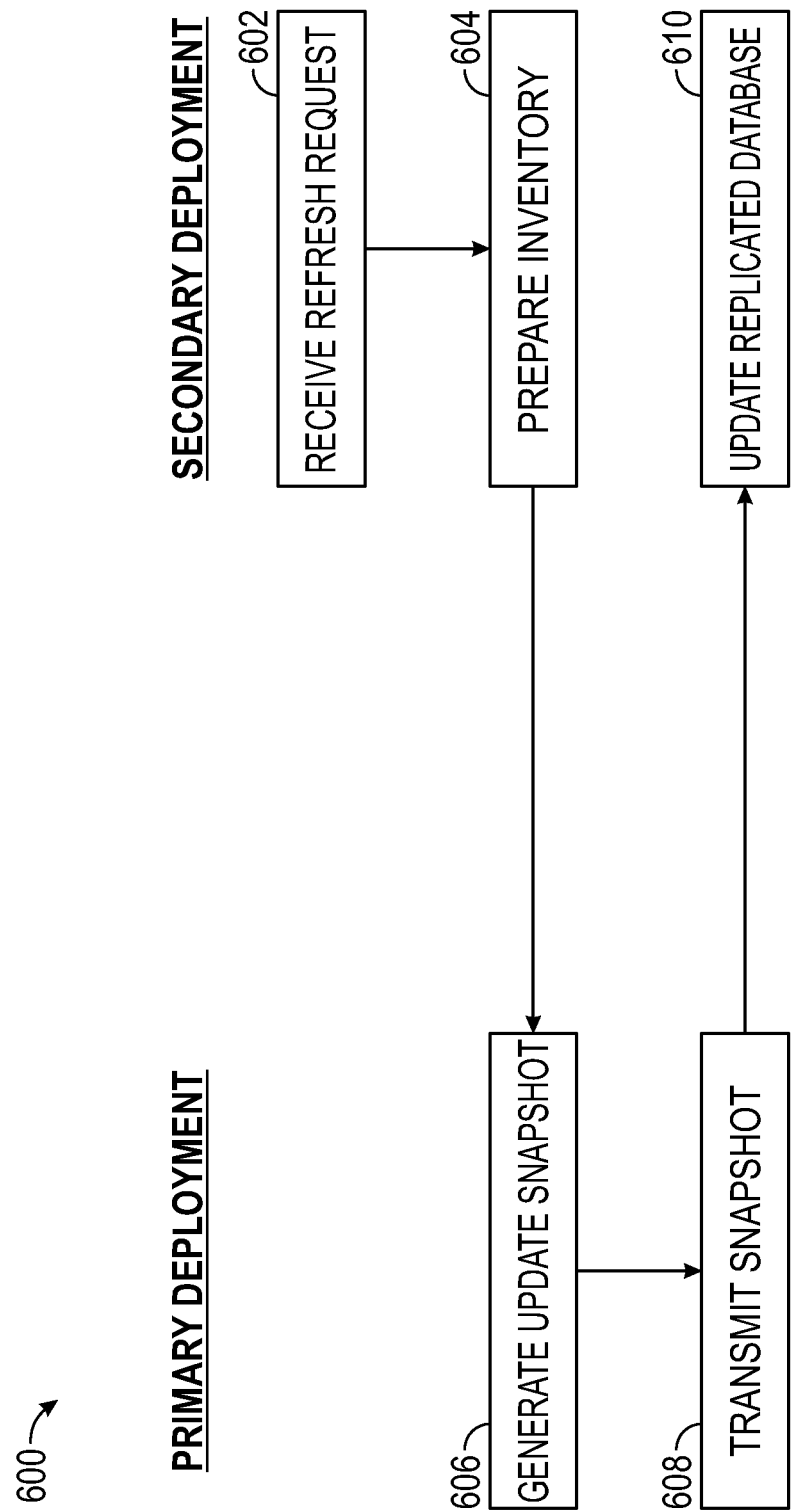
FIG. 6 illustrates a flow diagram for a method for replicating a table with stream replication, according to some example embodiments.

FIG. 6 illustrates a flow diagram for a method 600 for replicating a table with stream replication, according to some example embodiments. Method 600 may be executed using components, such as compute service managers described above, at respective primary and secondary deployments. The primary table or database to be replicated is stored at the primary deployment, and the replicated version of the primary table is stored at the secondary deployment.

At operation 602, a command may be received at the secondary deployment to replicate or refresh a replication of a database. The command may be a manual command from a user or may be received via a task that executes on a regular basis (e.g., every few minutes, hours, etc.). For example, a customer may set up a task to replicate a database every four hours or so in case of failures at the primary deployment.

At operation 604, the secondary deployment may prepare an inventory indicating the status of the latest replicated copy of the database it has currently stored. The inventory may include information regarding the current state of the secondary database, which includes the latest replicated primary table version. The inventory may also include state information regarding the latest replicated stream, such as the offsets from the primary table to enable stream replication. If the command is for an initial replication request, the inventory may be empty. The secondary deployment may then transit the inventory to the primary deployment.

At operation 606, the primary deployment may receive the inventory from the secondary deployment and may compute an update snapshot for the secondary based on the received inventory. In some embodiments, the update can be a full update or a delta update. The snapshot may include information indicating the changes on the primary table since the last refresh. The snapshot may also track streams created on the primary table and may include information regarding select table versions and partitions in the snapshot to enable stream replication at the secondary deployment, as described in further detail below.

The snapshot may include replication information of the table versions to which corresponding streams point. The snapshot may also include a list of expression property (EP) files per table version and table data for certain partitions used for stream replication. Expression properties of a table may include two types of files: delta EP files and compacted EP files. Delta EP files may track changes between table versions. Compacted EP files may be periodically generated when multiple delta EP files are combined and may represent one point in time.

For example, table versions with initial offsets of streams may be included in the snapshot for replication that otherwise may not have been included in the snapshot. Based on the type of stream (e.g., delta, append-only), select partitions may be included in the snapshot for replication that otherwise may not have been included in the snapshot if not for enabling stream replication. The snapshot may also include relevant EP information for table versions, including delta EP files.

At operation 608, the primary deployment may transmit the update snapshot to the second deployment. At operation 610, the second deployment may update its replicated database based on the received snapshot. Without stream replication, typically one table version (the current table version) per table on the secondary deployment is committed. However, to enable stream replication, multiple table versions for one table based on stream offsets can be committed. For each replicated stream, the stream state DPO (Data Persistent Object) may be updated to provide a reference to the new replicated table versions.

If a failover occurs (i.e., primary table in the primary deployment becomes unaccessible), the replicated database at the secondary deployment may take over as the primary database without losing access to the data. Moreover, as explained below in further detail, streams may remain operational at the replicated database in the secondary deployment because of selective replication of identified table versions and partitions that are used for streams. Thus, at a failover, a user can seamlessly maintain usage of and functionality provided by the database including streams via the replicated database in the secondary deployment. For example, a user may then send queries to the secondary deployment instead of the primary deployment in the case of a failover, and the secondary deployment may execute queries using the replicated database.

Figure 7:
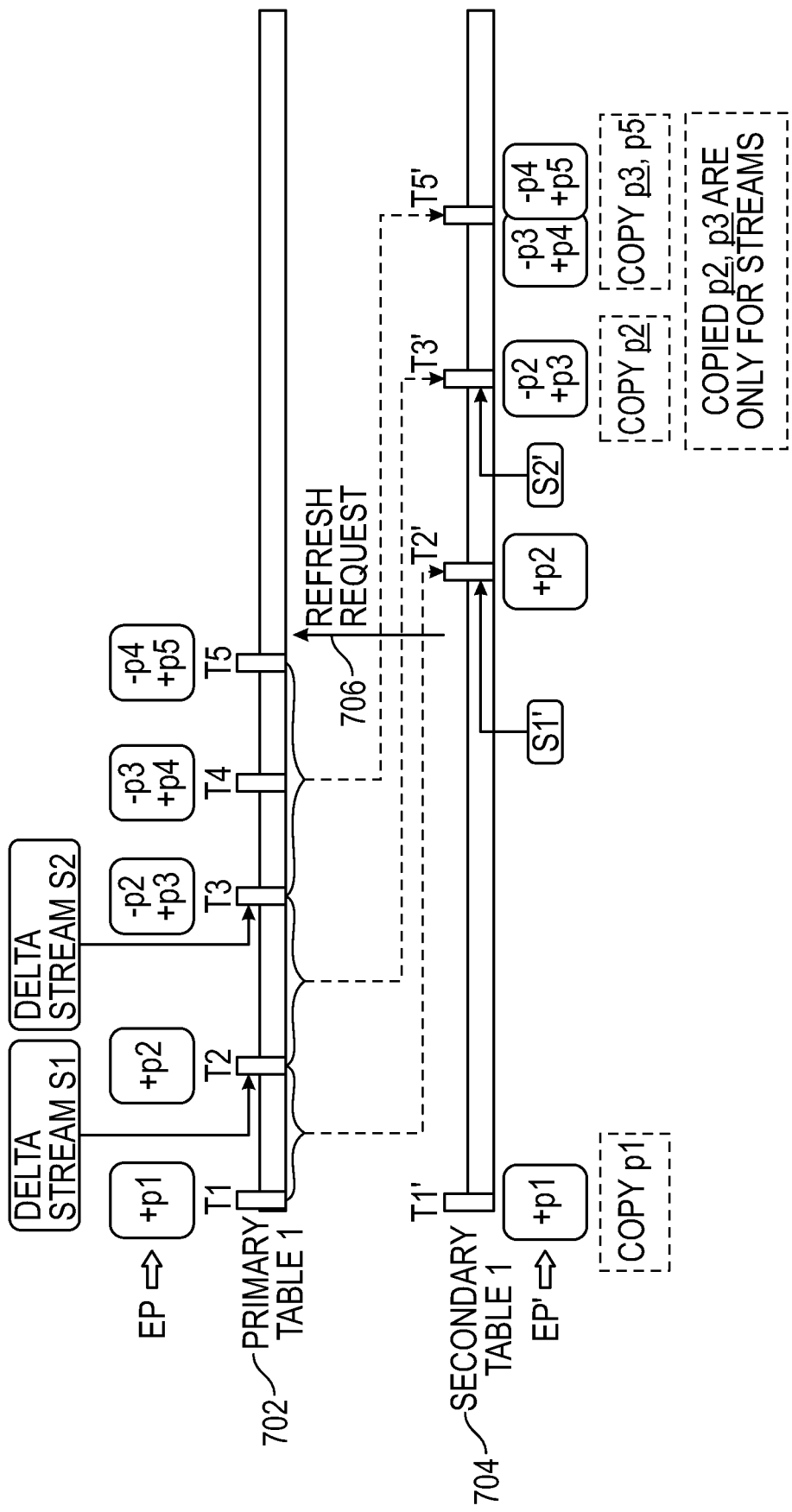
FIG. 7 illustrates a table replication scenario with delta stream replication, according to some example embodiments.

FIG. 7 illustrates a table replication scenario with delta stream replication, according to some example embodiments. FIG. 7 illustrates a primary table 702 with five table versions T1-T5 and their corresponding EP files illustrating the changes made in each table version. For example, partition p1 was inserted in T1 and p2 was inserted in T2, as illustrated. In T3, p2 was deleted and p3 was inserted. In T4, p3 was deleted and p4 was inserted. In T5, p4 was deleted and p5 was inserted.

The primary table 702 also has two delta streams attached to it: S1 and S2. S1 has its offset set between T2 and the current version of the primary table 702, which is T5 in this example. Because S1 is a delta stream, which shows only net changes between the two offsets, the current content of S1 will include net changes in T3-T5 as its offset set to T2. The stream includes changes following (but not including) the offset. Thus, the current content of S1 may show the deletion of p2 and addition of p5. For example, the insertion of p3 will not be included in S1 because p3 was then deleted in T4, which is before T5. The same is true for the insertion and deletion of p4.

The secondary table 704 shows the replicated versions of the primary table 702. T1' shows the initial replication of T1. A refresh request 706 is received after T5 has been created in the primary table 702. Hence, in conventional data replication techniques, T5 would only be replicated with T5', and streams S1 and S2 would not be able to be replicated because the data needed for their operation would not be included in the conventional replication process.

The replication techniques described herein solves these problems by replicating select table version and partition data needed for stream replication. For example, table versions including offsets of streams are replicated for stream replication. Here, to enable replication of S1 as S1', T2 is replicated as T2' because stream S1 has an offset pointed to T2. Likewise, to enable replication of S2 as S2', T3 is replicated as T3' because stream S2 has an offset pointed to T3. Relevant EP files of T2 and T3 are replicated as EP' files for T2' and T3', as shown. Since T4 has no accompanying stream offset, T4 is not replicated. The EP files of non-replicated T4 are collapsed into the EP' files of T5, as shown.

Select table data stored in partitions is also replicated to enable stream replication. First, partitions for replicating the current version of the table are selected for replication. Here, only p5 is copied for replicating the current version of the primary table 702 as T5'. Second, partitions needed for stream replication are replicated. Here, for delta stream S1', partition p2 is needed. Hence, p2 is additionally replicated for enabling replicated stream S1'. Likewise, p3 is replicated for enabling replicated stream S2'.

Figure 8:
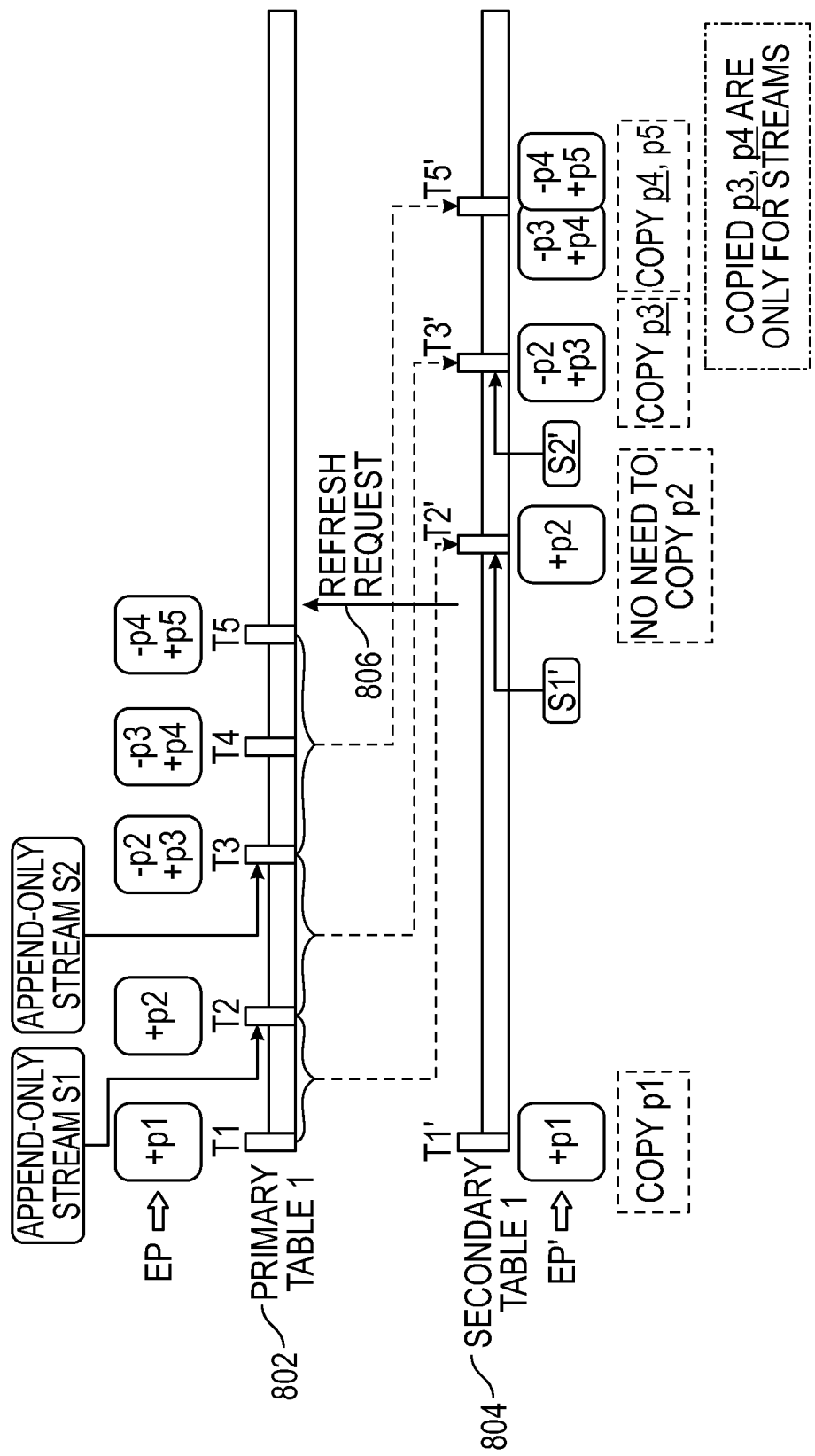
FIG. 8 illustrates a table replication scenario with append-only stream replication, according to some example embodiments.

FIG. 8 illustrates a table replication scenario with append-only stream replication, according to some example embodiments. FIG. 8 illustrates a primary table 802 with five table versions T1-T5 and their corresponding EP files illustrating the changes made in each table version. For example, partition p1 was inserted in T1 and p2 was inserted in T2, as illustrated. In T3, p2 was deleted and p3 was inserted. In T4, p3 was deleted and p4 was inserted. In T5, p4 was deleted and p5 was inserted.

The primary table 802 also has two append-only streams attached to it: S1 and S2. S1 has its offset set between T2 and the current version of the primary table 802, which is T5 in this example. Because S1 is an append-only stream, which tracks only row inserts between the two offsets, the current content of S1 will include new row inserts in T3-T5. The stream includes new row inserts following (but not including) the offset.

The secondary table 804 shows the replicated versions of the primary table 802. T1' shows the initial replication of T1. A refresh request 806 is received after T5 has been created in the primary table 802. Hence, in conventional data replication techniques, T5 would only be replicated with T5', and append-only streams S1 and S2 would not be able to be replicated because the data needed for their operation would not be included in the conventional replication process.

The replication techniques described herein solves these problems by replicating select table version and partition data needed for stream replication. For example, table versions including offsets of streams are replicated for stream replication. Here, to enable replication of S1 as S1', T2 is replicated as T2' because stream S1 has an offset pointed to T2. Likewise, to enable replication of S2 as S2', T3 is replicated as T3' because stream S2 has an offset pointed to T3. Relevant EP files of T2 and T3 are replicated as EP' files for T2' and T3', as shown. Since T4 has no accompanying stream offset, T4 is not replicated. The EP files of non-replicated T4 are collapsed into the EP' files of T5, as shown.

Select table data stored in partitions is also replicated to enable stream replication. First, partitions for replicating the current version of the table are selected for replication. Here, only p5 is copied for replicating the current version of the primary table 802 as T5'. Second, partitions needed for stream replication are replicated. Here, for append-only stream S1', partitions p3 and p4 are further needed (in addition to p5) to enable stream replication. Partition p2 is not copied because the offset of S1' points to T2, so only new row inserts following T2 are needed for the append-only stream S1'. For append-only stream S2', partition p4 is further needed (in addition to p5) to enable stream replication. Thus, partitions p3 and p4 are replicated only for stream replication.

Figure 9:
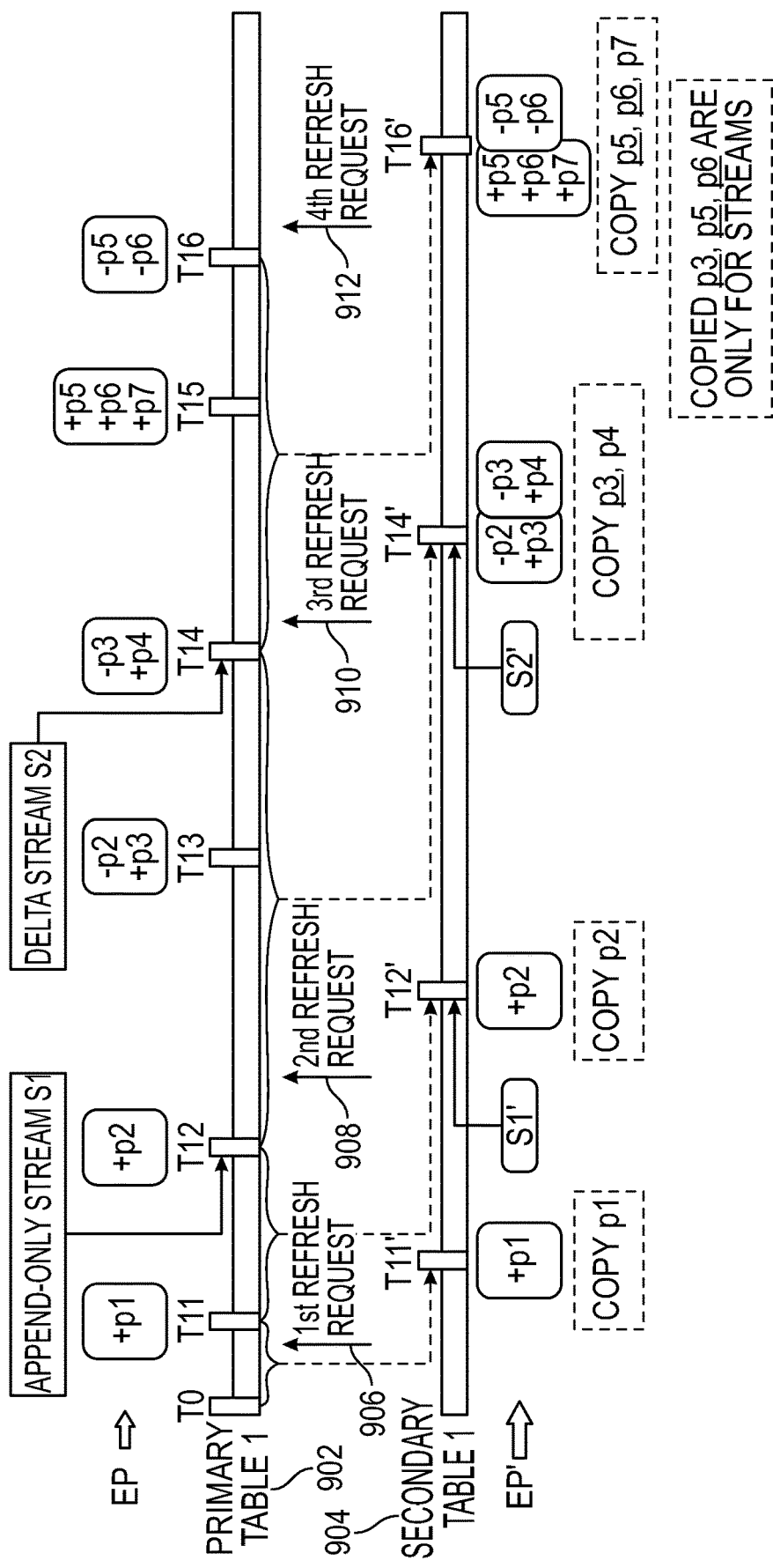
FIG. 9 illustrates a table replication scenario with delta and append-only stream replication, according to some example embodiments.

FIG. 9 illustrates a table replication scenario with delta and append-only stream replication, according to some example embodiments. FIG. 9 illustrates a primary table 902 with original version T0 and later iterations of T11-T15. For example, partition p1 was inserted in T11 and p2 was inserted in T12, as illustrated. In T13, p2 was deleted and p3 was inserted. In T14, p3 was deleted and p4 was inserted. In T15, p5, p6, and p7 were inserted. In T16, p5 and p6 were deleted. The primary table 902 also includes an append-only stream S1 pointing to T12 and a delta stream S2 pointing to T14.

The secondary table 904 shows the replicated versions of the primary table 902. In this example, four separate refresh requests 906-912 are illustrated. The first refresh request 906 is received after T1 was created in the primary table 902. For this replication request, T11 is replicated as T11' including replicating partition p1. No additional data needs to be replicated because no stream is implicated in the replication.

The second refresh request 908 is received after T12 was created in the primary table 902. For this replication request, T12 is replicated as T12' including replicating p2. No additional data needs to be replicated because while append-only S1' is replicated it requires no additional data at this point to operate in the secondary deployment.

The third refresh request 910 is received after T14 was created in the primary table 902. For this replication request, T14 is replicated as T14' collapsing the EP files of T13 and T14 because no stream points to T13. Partition p4 is also copied for replicating T14. However, partition p3 is also replicated for enabling replication of append-only stream S1' even though p3 was deleted in T14.

The fourth refresh request 912 is received after T16 was created in the primary table 902. For this replication request, T16 is replicated T16' collapsing the EP files of T15 and T16 because no stream points to T15. Partition p7 is also copied for replicating T16. However, partitions p5 and p6 are also replicated for enabling replication of append-only stream S1' even though p5 and p6 were deleted in T16 (thus not having to be included in delta stream S2).

Figure 10:
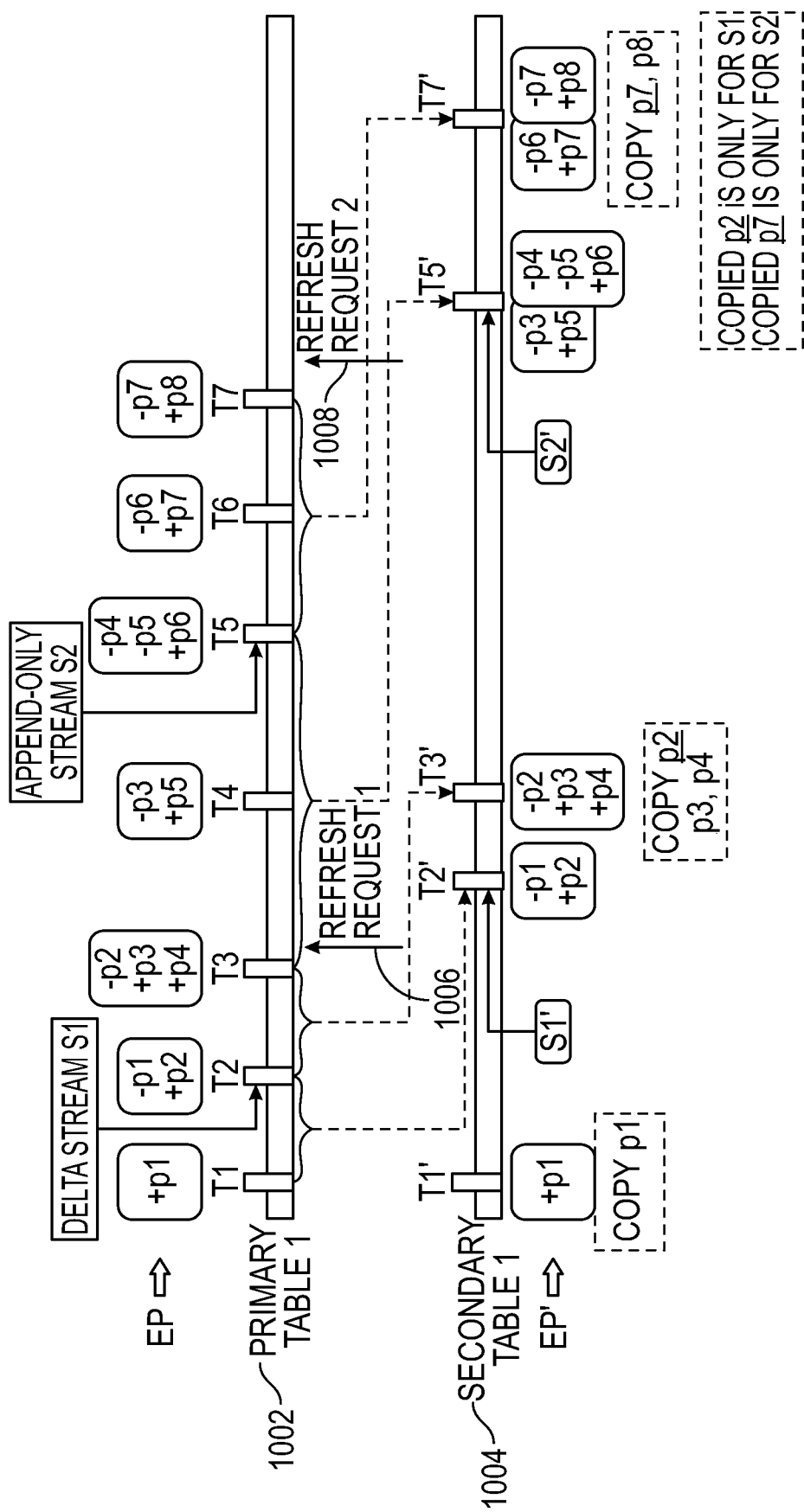
FIG. 10 illustrates a table replication scenario with delta and append-only stream replication, according to some example embodiments.

FIG. 10 illustrates a table replication scenario with delta and append-only stream replication, according to some example embodiments. FIG. 10 illustrates a primary table 1002 table versions T1-T7. For example, partition p1 was inserted in T1, as illustrated. In T2, p1 was deleted and p2 was inserted. In T3, p2 was deleted and p3, p4 were inserted. In T4, p3 was deleted and p5 was inserted. In T5, p4 and p5 were deleted and p6 was inserted. In T6, p6 was deleted and p7 was inserted. In T7, p7 was deleted and p8 was inserted. The primary table 1002 also includes a delta stream S1 pointing to T2 and an append only stream S2 pointing to T5.

The secondary table 1004 shows the replicated versions of the primary table 1002. In this example, two separate refresh requests 1006, 1008 are illustrated. The first refresh request 1006 is received after T3 was created in the primary table 1002. For this replication request, T3 is replicated as T3' and partitions p3 and p4 are replicated for copying T3'. However, to enable replication of delta stream S1 and S1', additional data is copied. T2 is replicated as T2' because S1 points to T2. Moreover, p2 is replicated for enabling replication of S1'.

The second refresh request is received after T7 was created in the primary table 1002. For this replication request, T7 is replicated as T7' and partition p8 is replicated for copying T7'. Additional data is copied for enabling stream replication of S2 as S2'. T5 is replicated as T5' because S2 points to T5. EP files of T4 are collapsed into T5' for S1'. EP files of T6 are collapsed into T7' as shown. Moreover, p7 is replicated enabling replication of S2'.

A stream can become stale when its offset is outside of a data retention period for its source table. When a stream becomes stale, the historical data for the primary table is no longer accessible, including any unconsumed change records. A stream becoming stale can affect stream replication.

Figure 11:
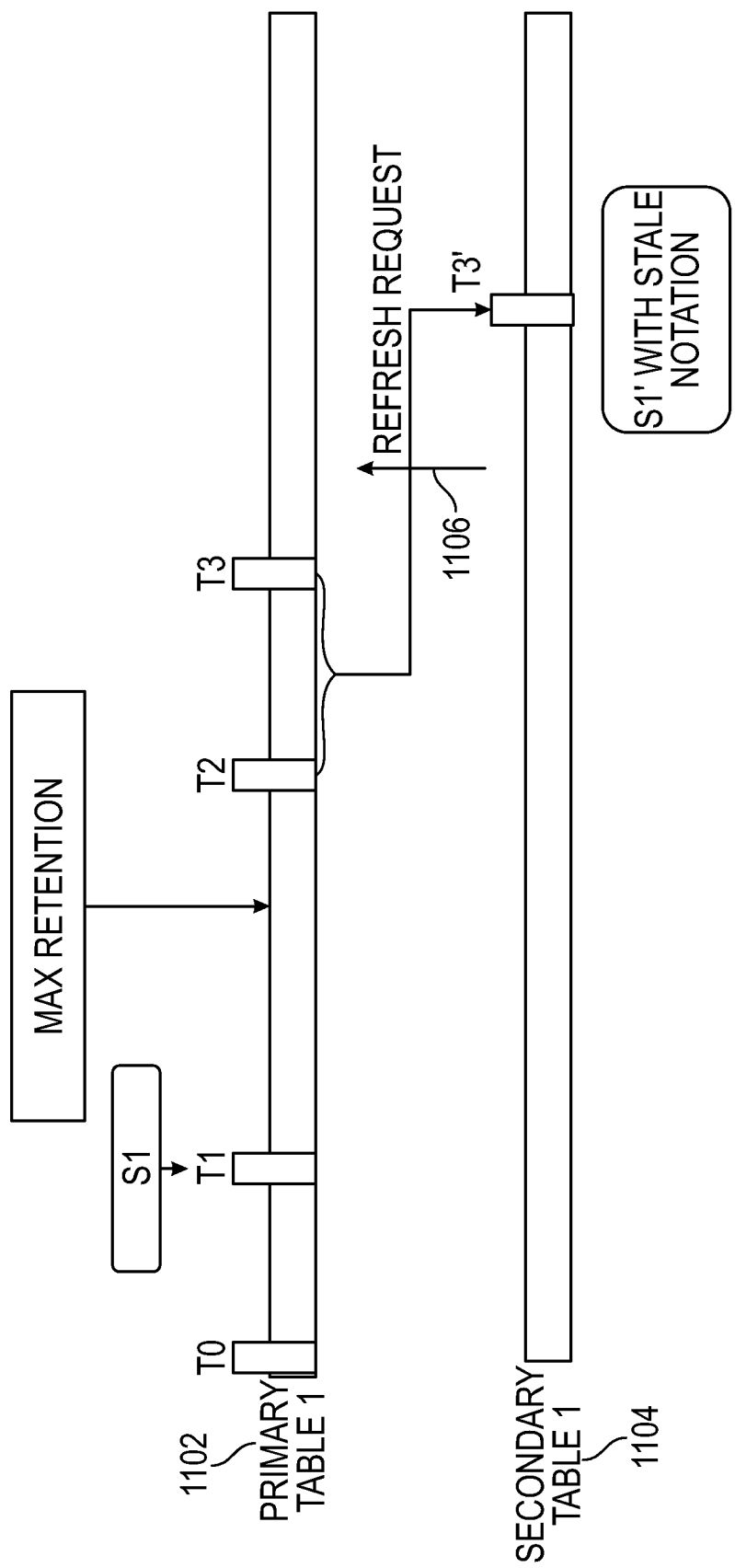
FIG. 11 illustrates a table replication scenario with a stale stream, according to some example embodiments.

FIG. 11 illustrates a table replication scenario with a stale stream, according to some example embodiments. FIG. 11 illustrates a primary table 1102 with original table versions T0-T3. The primary table 1102 also includes a stream S1 pointing to T1. However, a max retention time is set between table versions T1 and T2. Thus, data before T2 in the primary table 1102 is no longer retained. Delta EP files before the max retention time are compacted into compacted EP files, which do not include sufficient information for enabling steam reads.

The secondary table 1104 shows the replicated versions of the primary table 1102. A refresh request 1106 is received after T3 was created in the primary table 1102. Thus, table and stream replication may be executed as described herein. However, data needed for complete replication of stream S1 is now beyond the max retention time. Therefore, S1 is replicated as S1' but will include a notation that S1' may be incomplete because it includes stale or inaccessible data.

Figure 12:
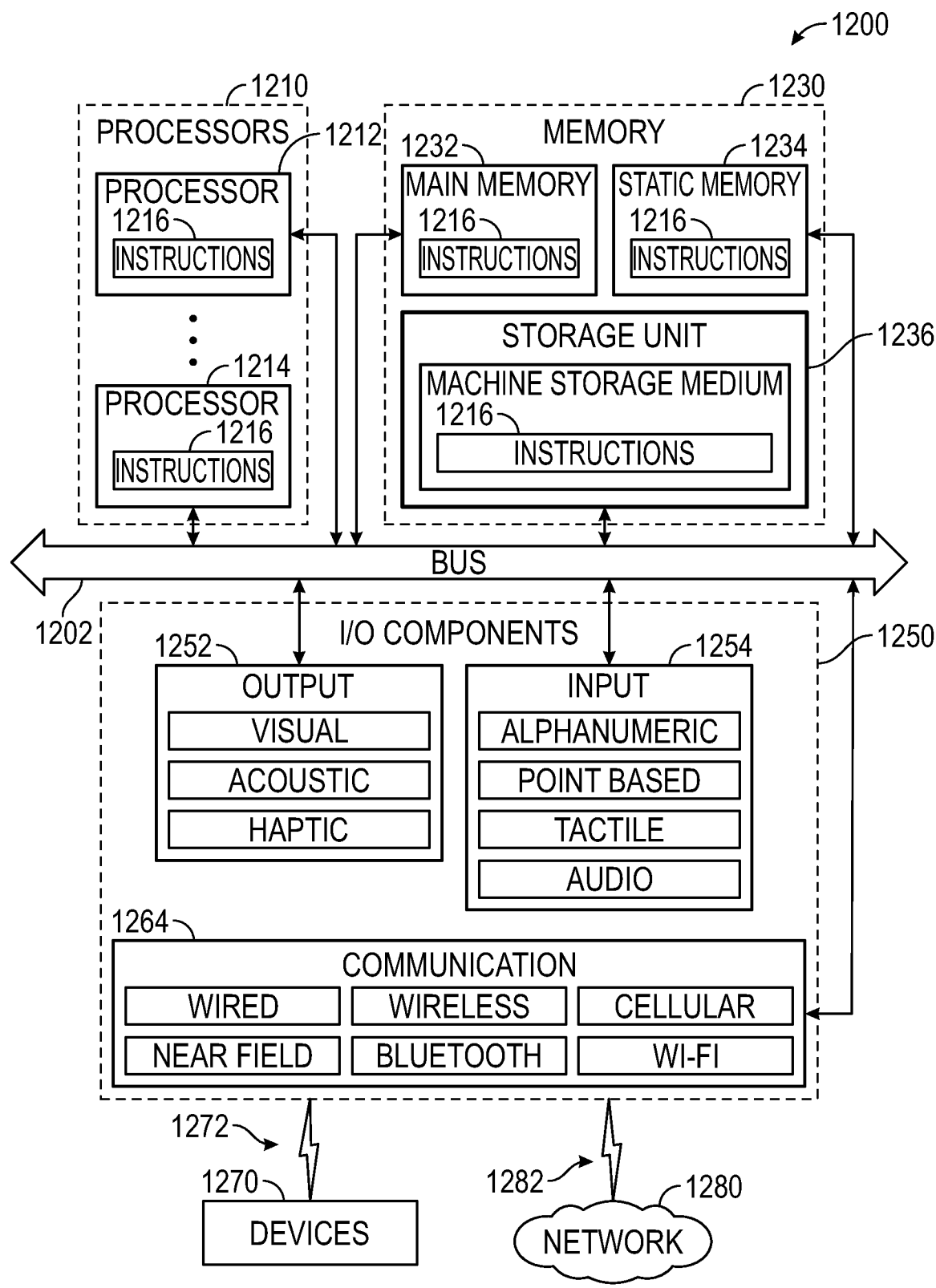
FIG. 12 illustrates a diagrammatic representation of a machine in the form of a computer system within which a set of instructions may be executed for causing the machine to perform any one or more of the methodologies discussed herein, in accordance with some embodiments of the present disclosure.

FIG. 12 illustrates a diagrammatic representation of a machine 1200 in the form of a computer system within which a set of instructions may be executed for causing the machine 1200 to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may cause the machine 1200 to execute any one or more operations of any one or more of the methods described herein. As another example, the instructions 1216 may cause the machine 1200 to implement portions of the data flows described herein. In this way, the instructions 1216 transform a general, non-programmed machine into a particular machine 1200 (e.g., the remote computing device 106, the access management system 110, the compute service manager 112, the execution platform 114, the access management system 118, the Web proxy 120) that is specially configured to carry out any one of the described and illustrated functions in the manner described herein.

In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 includes processors 1210, memory 1230, and input/output (I/O) components 1250 configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors 1210 that may comprise two or more independent processors (sometimes referred to as "cores") that may execute instructions 1216 contemporaneously. Although FIG. 12 shows multiple processors 1210, the machine 1200 may include a single processor with a single core, a single processor with multiple cores (e.g., a multi-core processor), multiple processors with a single core, multiple processors with multiple cores, or any combination thereof.

The memory 1230 may include a main memory 1232, a static memory 1234, and a storage unit 1236, all accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 include components to receive input, provide output, produce output, transmit information, exchange information, capture measurements, and so on. The specific I/O components 1250 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, and other communication components to provide communication via other modalities. The devices 1270 may be another machine or any of a wide variety of peripheral devices (e.g., a peripheral device coupled via a universal serial bus (USB)). For example, as noted above, the machine 1200 may correspond to any one of the remote computing device 106, the access management system 118, the compute service manager 112, the execution platform 114, the Web proxy 120, and the devices 1270 may include any other of these systems and devices.

The various memories (e.g., 1230, 1232, 1234, and/or memory of the processor(s) 1210 and/or the storage unit 1236) may store one or more sets of instructions 1216 and data structures (e.g., software) embodying or utilized by any one or more of the methodologies or functions described herein. These instructions 1216, when executed by the processor(s) 1210, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1280 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: storing a table at a first deployment of a database system, the table including data organized in a plurality of partitions and the table including a stream tracking change data capture information related to the table; in response to a refresh request for replication, generating, by a second deployment of the database system, an inventory including status information of a replicated copy of the table stored at the second deployment; generating, by the first deployment, an update snapshot based on the inventory received from the second deployment, the update snapshot including information indicating changes on the table stored at the first deployment since a last refresh and including information regarding at least one select table version and at least one select partition for enabling replication of the stream; transmitting the update snapshot from the first deployment to the second deployment; and generating, by the second deployment, a refreshed replicated copy of the table at the second deployment based on the update snapshot, the refreshed replicated copy including a replicated copy of the stream using replicated copies of the at least one select table version and the at least one select partition.

Example 2. The method of example 1, further comprising: identifying, by the first deployment, a current table version of the table to include in the update snapshot based on the inventory; and identifying, by the first deployment, at least one table version prior to the current table version as the at least one select table version to include in the update snapshot for enabling replication of the stream.

Example 3. The method of any of examples 1-2, wherein the at least one select table version is related to an offset of the stream.

Example 4. The method of any of examples 1-3, further comprising: identifying, by the first deployment, a type of the stream; and based on the identified type of the stream, identifying, by the first deployment, at least one partition not included in a current table version of the table as the at least one select partition to include in the update snapshot.

Example 5. The method of any of examples 1-4, wherein the identified type is a delta type stream, and wherein the at least one select partition was deleted in the table prior to the current table version.

Example 6. The method of any of examples 1-5, wherein the identified type is an append-only type stream, and wherein the at least one select partition was added and then deleted in the table prior to the current table version.

Example 7. The method of any of examples 1-6, further comprising: detecting a failover event at the first deployment; and in response to the failover event, executing, by the second deployment, a query received from a user using the refreshed replicated copy of the table at the second deployment.

Example 8. A system comprising: one or more processors of a machine; and a memory storing instructions that, when executed by the one or more processors, cause the machine to perform operations implementing any one of example methods 1 to 7.

Example 9. A machine-readable storage device embodying instructions that, when executed by a machine, cause the machine to perform operations implementing any one of example methods 1 to 7.

What is claimed is:

1. A method comprising:
   storing a table at a first deployment of a database system, the table including data organized in a plurality of partitions and the table including a stream tracking change data capture information related to the table;
   in response to a refresh request for replication, generating, by a second deployment of the database system, an inventory including status information of a replicated copy of the table stored at the second deployment;
   identifying, by the first deployment, a current table version of the table to include in an update snapshot based on the inventory;
   identifying, by the first deployment, the stream as an append-only stream recording row inserts into the table and not recording update and delete operations on the table;
   identifying, by the first deployment, at least one table version prior to the current table version as an at least one select table version to include in the update snapshot for enabling replication of the stream that is not required for replicating the current table version;
   generating, by the first deployment, the update snapshot based on the inventory received from the second deployment, the update snapshot including information indicating changes on the table stored at the first deployment since a last refresh and including information regarding the at least one select table version and at least one select partition for enabling replication of the stream, the at least one select partition being deleted in the table prior to the current table version;
   transmitting the update snapshot from the first deployment to the second deployment; and
   generating, by the second deployment, a refreshed replicated copy of the table at the second deployment based on the update snapshot, the refreshed replicated copy including a replicated copy of the stream using replicated copies of the at least one select table version and the at least one select partition.

2. The method of claim 1, wherein the at least one select table version is related to an offset of the stream.

3. The method of claim 1, further comprising:
   detecting a failover event at the first deployment; and in response to the failover event, executing, by the second deployment, a query received from a user using the refreshed replicated copy of the table at the second deployment.

4. A machine-storage medium embodying instructions that, when executed by a machine, cause the machine to perform operations comprising:

storing a table at a first deployment of a database system, the table including data organized in a plurality of partitions and the table including a stream tracking change data capture information related to the table;

in response to a refresh request for replication, generating, by a second deployment of the database system, an inventory including status information of a replicated copy of the table stored at the second deployment;

identifying, by the first deployment, a current table version of the table to include in an update snapshot based on the inventory;

identifying, by the first deployment, the stream as an append-only stream recording row inserts into the table and not recording update and delete operations on the table;

identifying, by the first deployment, at least one table version prior to the current table version as an at least one select table version to include in the update snapshot for enabling replication of the stream that is not required for replicating the current table version;

generating, by the first deployment, the update snapshot based on the inventory received from the second deployment, the update snapshot including information indicating changes on the table stored at the first deployment since a last refresh and including information regarding the at least one select table version and at least one select partition for enabling replication of the stream, the at least one select partition being deleted in the table prior to the current table version;

transmitting the update snapshot from the first deployment to the second deployment; and generating, by the second deployment, a refreshed replicated copy of the table at the second deployment based on the update snapshot, the refreshed replicated copy including a replicated copy of the stream using replicated copies of the at least one select table version and the at least one select partition.

5. The machine-storage medium of claim 4, wherein the at least one select table version is related to an offset of the stream.

6. The machine-storage medium of claim 4, further comprising:

detecting a failover event at the first deployment; and
in response to the failover event, executing, by the second deployment, a query received from a user using the refreshed replicated copy of the table at the second deployment.

7. A system comprising:
at least one hardware processor; and
at least one memory storing instructions that, when executed by the at least one hardware processor, cause the at least one hardware processor to perform operations comprising:

storing a table at a first deployment of a database system, the table including data organized in a plurality of partitions and the table including a stream tracking change data capture information related to the table;

in response to a refresh request for replication, generating, by a second deployment of the database system, an inventory including status information of a replicated copy of the table stored at the second deployment;

identifying, by the first deployment, a current table version of the table to include in an update snapshot based on the inventory;

identifying, by the first deployment, the stream as an append-only stream recording row inserts into the table and not recording update and delete operations on the table;

identifying, by the first deployment, at least one table version prior to the current table version as an at least one select table version to include in the update snapshot for enabling replication of the stream that is not required for replicating the current table version;

generating, by the first deployment, the update snapshot based on the inventory received from the second deployment, the update snapshot including information indicating changes on the table stored at the first deployment since a last refresh and including information regarding the at least one select table version and at least one select partition for enabling replication of the stream, the at least one select partition being deleted in the table prior to the current table version;

transmitting the update snapshot from the first deployment to the second deployment; and generating, by the second deployment, a refreshed replicated copy of the table at the second deployment based on the update snapshot, the refreshed replicated copy including a replicated copy of the stream using replicated copies of the at least one select table version and the at least one select partition.

8. The system of claim 7, wherein the at least one select table version is related to an offset of the stream.

9. The system of claim 7, the operations further comprising:

detecting a failover event at the first deployment; and
in response to the failover event, executing, by the second deployment, a query received from a user using the refreshed replicated copy of the table at the second deployment.

* * * * *